(12) United States Patent
Graham et al.

(10) Patent No.: US 11,783,440 B2
(45) Date of Patent: Oct. 10, 2023

(54) SYSTEM AND METHOD FOR GENERATING A PHOTOGRAPHIC POLICE LINEUP

(71) Applicant: Intergraph Corporation, Madison, AL (US)

(72) Inventors: Michael Copeland Graham, Huntsville, AL (US); Timothy Mark McIntire, Huntsville, AL (US); Anthony Klotz, Athens, AL (US); Xiangdong Yang, Madison, AL (US)

(73) Assignee: Intergraph Corporation, Madison, AL (US)

( * ) Notice: Subject to any disclaimer, the term of this patent is extended or adjusted under 35 U.S.C. 154(b) by 360 days.

(21) Appl. No.: 16/006,186

(22) Filed: Jun. 12, 2018

(65) Prior Publication Data
US 2019/0095752 A1  Mar. 28, 2019

Related U.S. Application Data

(60) Provisional application No. 62/518,192, filed on Jun. 12, 2017.

(51) Int. Cl.
| | |
|---|---|
| *G06Q 50/26* | (2012.01) |
| *G06V 40/16* | (2022.01) |
| *G06F 18/22* | (2023.01) |
| *G06V 10/74* | (2022.01) |
| *G06F 16/583* | (2019.01) |
| *G06F 16/51* | (2019.01) |

(Continued)

(52) U.S. Cl.
CPC ............ *G06Q 50/26* (2013.01); *G06F 16/51* (2019.01); *G06F 16/54* (2019.01); *G06F 16/5838* (2019.01); *G06F 18/22* (2023.01); *G06V 10/761* (2022.01); *G06V 40/168* (2022.01); *G06V 40/172* (2022.01); *G06V 40/173* (2022.01); *G06F 3/0482* (2013.01)

(58) Field of Classification Search
CPC ... H04N 21/23418; G06F 16/51; G06F 16/54; G06F 3/0482; G06K 9/00268; G06K 9/00288; G06K 9/00295; G06Q 50/26
See application file for complete search history.

(56) References Cited

U.S. PATENT DOCUMENTS

| | | | |
|---|---|---|---|
| 2006/0023923 A1* | 2/2006 | Geng | G06T 19/20 382/116 |
| 2006/0197753 A1* | 9/2006 | Hotelling | G06F 1/1637 345/173 |

(Continued)

OTHER PUBLICATIONS

MacLin, O., et al., "PC_Eyewitness and the Sequential Superiority Effect: Computer-Based Lineup Administration," *Law and Human Behavior*, vol. 29, Issue No. 3, pp. 303-321 (Jun. 2005).

(Continued)

*Primary Examiner* — Ross Varndell
(74) *Attorney, Agent, or Firm* — Nutter McClennen & Fish LLP

(57) ABSTRACT

Various embodiments enable computers to automatically create photographic lineups for police use and, in so doing, eliminate risks associate with subject judgment involved in human selection of fillers for such photographic lineups. Moreover, various improve the reliability of photographic lineups by selecting images of fillers that are similar to, but not too similar to, an image of the suspect.

22 Claims, 7 Drawing Sheets

(51) Int. Cl.
*G06F 16/54* (2019.01)
*G06F 3/0482* (2013.01)

(56) References Cited

U.S. PATENT DOCUMENTS

| | | | | |
|---|---|---|---|---|
| 2009/0174526 A1* | 7/2009 | Howard | ............ | G06K 9/00006 340/5.52 |
| 2009/0210245 A1* | 8/2009 | Wold | .................... | G06Q 10/10 700/300 |
| 2010/0172550 A1* | 7/2010 | Gilley | ................ | G06K 9/00288 382/118 |
| 2011/0043759 A1* | 2/2011 | Bushinsky | ............. | A61B 3/113 351/210 |
| 2013/0016882 A1* | 1/2013 | Cavallini | ............... | G06K 9/629 382/117 |
| 2019/0325198 A1* | 10/2019 | Friedland | ............. | G06F 16/583 |

OTHER PUBLICATIONS

Peska L., "Towards Recommender Systems for Police Photo Lineup," *Deep Learning for Recommender Systems*, pp. 1-6 (Aug. 2017).
eLineup.org., "eLineup Police Photo Lineup Application—Present Sequential or Simultaneous Lineups," 1 page (Aug. 25, 2015)—screen capture of Youtube page, as sent with the International Search Report.
eLineup.org., "eLineup Police Photo Application—Present Sequential or Simultaneous Lineups," 1 page (Aug. 25, 2015)—Video on DVD as Retrieved from the Internet: https://www.youtube.com/watch?v=4WSoaB8n8bE.
Ali Nowbakht Irani, Authorized officer European Patent Office, International Search Report—Application No. PCT/US2018/037063, dated Aug. 22, 2018, 15 pages, together with the Written Opinion of the International Searching Authority.

* cited by examiner

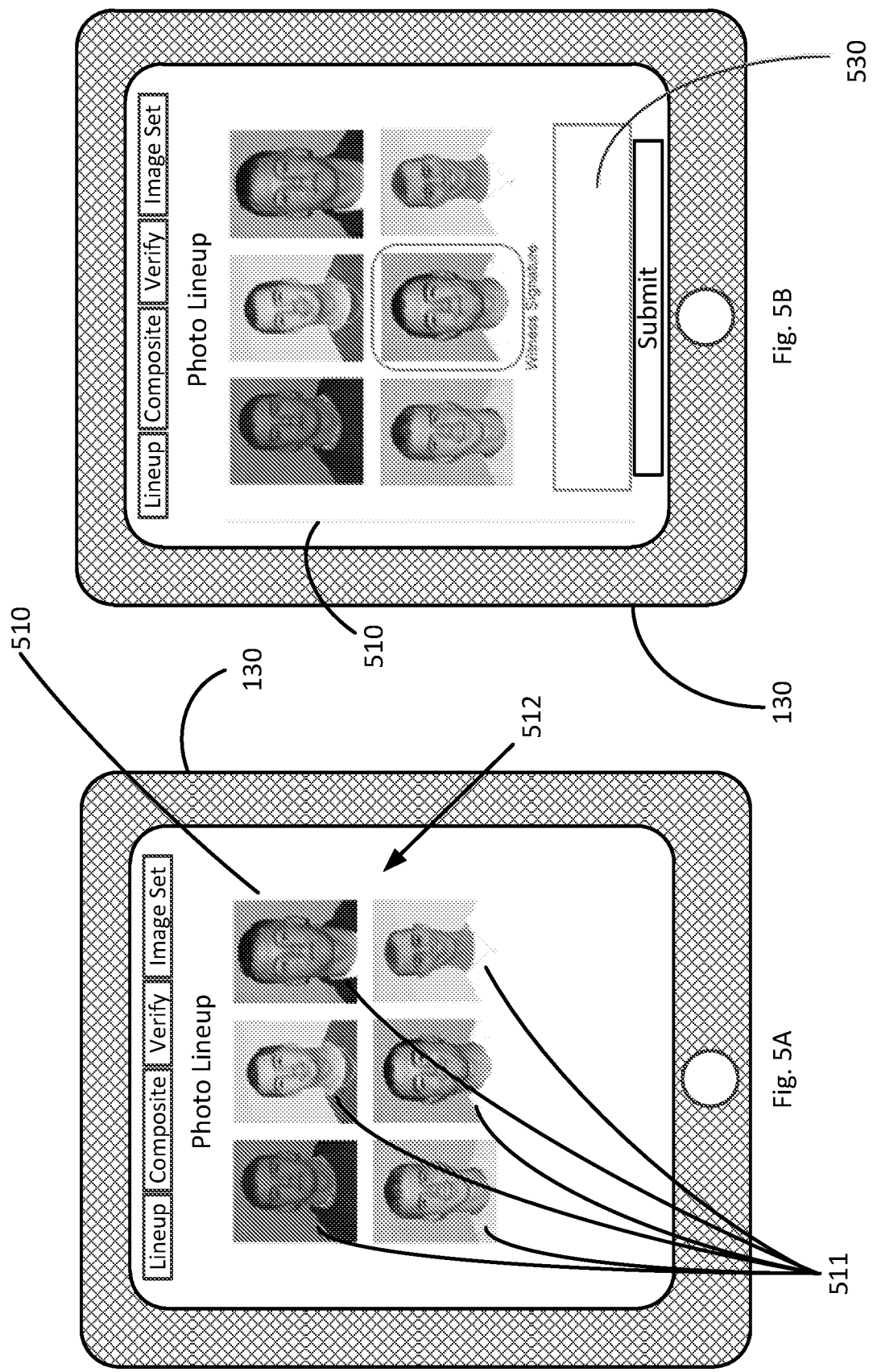

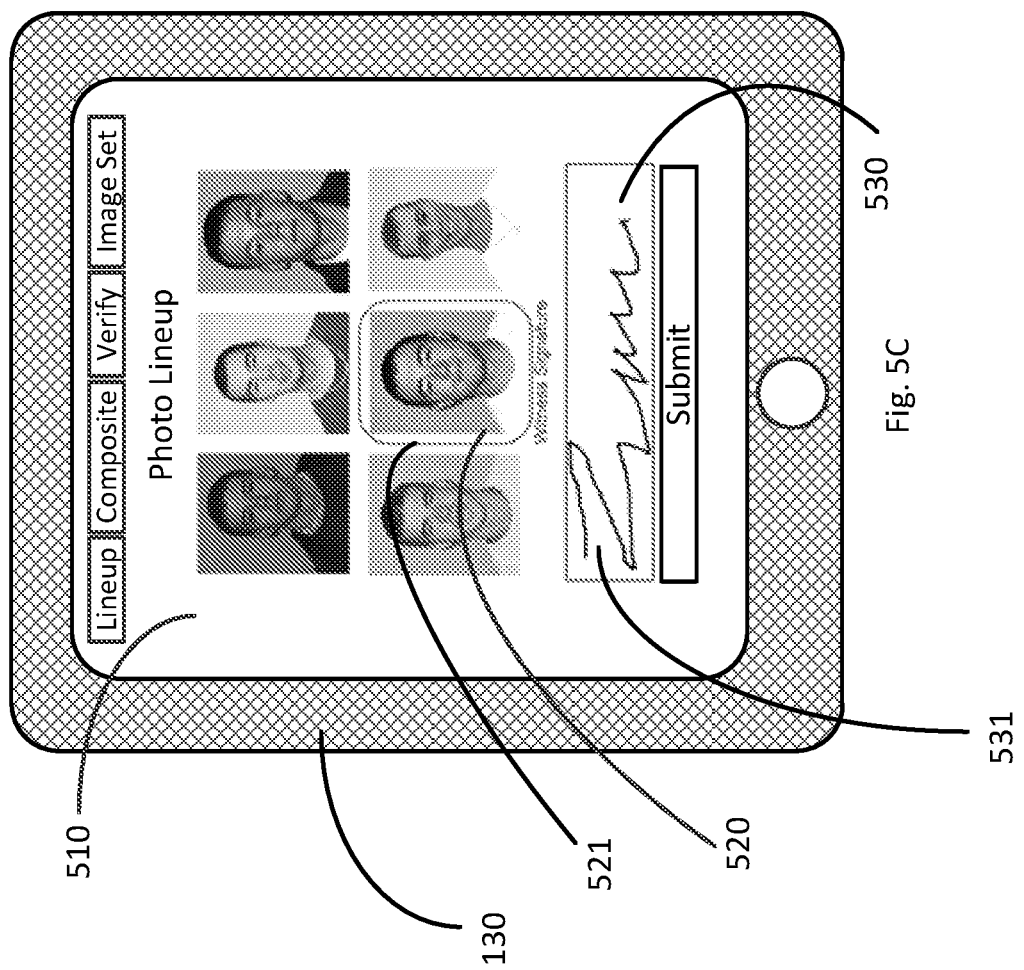

SYSTEM AND METHOD FOR GENERATING A PHOTOGRAPHIC POLICE LINEUP

RELATED APPLICATIONS

This patent application claims priority from provisional U.S. patent application No. 62/518,192, filed Jun. 12, 2017, entitled, "Familiar Face," and naming Michael Copeland Graham, Timothy Mark McIntire, Anthony Klotz, and Xiangdong Yang as inventors [practitioner's file 2686/1124], the disclosure of which is incorporated herein, in its entirety, by reference.

TECHNICAL FIELD

The present invention relates to police lineups, and more particularly to photograph-based police line-ups.

BACKGROUND ART

Police lineups are a well-known tool for identifying a criminal suspect. Traditionally, a police detective creates a lineup of live people including one suspect and several fillers. Recently, police have begun using photographic lineups including a photograph of a suspect and photographs of several fillers.

SUMMARY OF THE EMBODIMENTS

In accordance with one embodiment, a system for creating a photographic lineup, including an image of a suspect in a crime, includes a filler module configured to: compare the image of the suspect to a plurality of available images, and select, from the plurality of available images, a set of filler images, the filler images being similar to, but not overly similar to, the image of the suspect. The system also includes a lineup generation module configured to produce a photographic lineup including the image of the suspect and the filler images. Some embodiments also include a communications interface configured to receive the image of the suspect.

Some embodiments compare the suspect's image to the plurality of available images by characterizing the suspect's image and each of the plurality of available images using a uniformly-applied analysis system, such as Microsoft Azure's face verification facility. To that end, such a system may include a face analysis module configured to generate, from the image of the suspect, a set of suspect facial features. If a corresponding set of facial features is not available for each of the plurality of available images, the face analysis module generates, from those available images, such a corresponding set of facial features. The filler module is configured to compare the image of the suspect to a plurality of available images by comparing the set of suspect facial features to corresponding sets of facial features for each of the plurality of available images. For example, Microsoft Azure's face verification facility generates a confidence score indicating how likely it is that the face in the available image belongs to the person in the suspect image (i.e., how likely it is that that faces in the two images belong to the same person). In terms of comparing an available image to the image of the suspect, Microsoft Azure's face verification facility generates a confidence score indicating how likely it is that the face in the available image belongs to the suspect, with 1.0 being the highest likelihood, and 0.0 being the lowest likelihood, and confidence scores between 0.0 and 1.0 representing points between.

The filler module applies a rule to the confidence score to determine whether to include that available image in the set of filler images. For example, the rule rejects the available image (i.e., excludes the available image from a photographic lineup) if the confidence score exceeds a high threshold, which indicates a high likelihood that the face in the available image is the face of the suspect. The threshold for determining that confidence score indicates such a high likelihood may be established by law, or by a system designer or user. For example, a confidence score at or above 0.8 may be such a high likelihood.

The rule also rejects the available image if the confidence score indicates too low a likelihood (i.e., is below a low threshold), since the face in such an image would most likely be too dissimilar to the suspect's face. For example, a confidence score at or below 0.2 may be such a low likelihood.

The rule accepts the available image for inclusion into the set of filler images for any confidence score between 0.2 and 0.8.

Of course, the confidence scores used in the foregoing examples are merely illustrative, and different scores could be specified for different applications.

Once the set of filler images is established, a person may create a photographic lineup by including the suspect's image and some or all of the images in the set of filler images. To that end, creating the photographic lineup includes arranging the suspect's image and the filler images. Some embodiments also include a lineup presentation module configured to display the photographic lineup on a computer screen. The lineup presentation module, in some embodiments, is also configured to arrange the suspect's image and some or all of the images in the set of filler images within the lineup. For example, the lineup presentation module may place the suspect's image at a randomly selected location with respect to the filler images, or in other embodiments as a location, relative to the filler images, specified by the user.

Some embodiments also include an evidence module configured to record, in a non-alterable way, the selection by a witness of a single image from the photographic lineup. The evidence module may further be configured to record an authentication of the selection by the witness, such as a signature.

Another embodiment of a system for creating a photographic lineup, including an image of a suspect in a crime, includes a communications interface configured to receive the image of the suspect; and a filler module configured to compare the image of the suspect to a plurality of available images, and select, from the plurality of available images, a set of filler images, the filler images being similar to, but not overly similar to, the image of the suspect. The system also includes a lineup generation module configured to produce a photographic lineup including the image of the suspect and the filler images.

Some embodiments further include a lineup presentation module configured to display the photographic lineup on a display device. Some such embodiments also include an evidence module configured to record the selection, by a witness, of a single image from the photographic lineup. Moreover, in some such embodiments, the evidence module is further configured to record an authentication of the selection by the witness.

In illustrative embodiments, the image of the suspect is located, within the photographic lineup, at a randomly selected location with respect to the filler images. In other embodiments, the image of the suspect is located, within the photographic lineup, at a specified location relative to the filler images.

Some embodiments include a face analysis module configured to generate, from the image of the suspect, a set of suspect facial features. In such embodiments, the filler module is configured to compare the image of the suspect to a plurality of available images by comparing the set of suspect facial features to corresponding sets of facial features for each of the plurality of available images. Moreover, in some such embodiments, the filler module is configured to generate, for each of the plurality of available images, a confidence score indicating the similarity the image to the image of the suspect; and the filler module is configured to apply a rule each such confidence score, the rule selecting, from among the available images, a set of filler images. In addition, in some embodiments the rule rejects a given image from among the available images if the confidence score for the given image exceeds a high threshold, and in some embodiments the rule rejects a given image from among the available images if the confidence score for the given image is below a low threshold.

Yet another embodiment provides a method for operating a photographic lineup, including an image of the face of a suspect. The method includes analyzing the image of the face of the suspect to develop a set of objective suspect facial features, as well as analyzing each face in a set of potential filler images to develop, for each face in the set of filler images, a set of objective filler facial features. For each face in the set of filler images, the method includes applying a rule comparing the set of objective suspect facial features to a corresponding set of objective facial features for each of the plurality of available images, to select, from the set of potential filler images, a set of selected filler images. Then the rule includes producing a photographic lineup, the photographic lineup including the image of the face of the suspect, and the set of selected filler images.

In some embodiments, analyzing each face in a set of potential filler images further includes developing, based on the set of filler facial features, a confidence score for each face in a set of filler images, the confidence score indicating, for each face in the set of potential filler images, a likelihood that said face is the face of the suspect; and applying a rule includes comparing the confidence score to a threshold. In some embodiments, applying the rule further includes rejecting an image when the confidence score exceeds the threshold. In some embodiments, applying the rule further includes rejecting an image when the confidence score is below the threshold.

In some embodiments, producing a photographic lineup includes including a given image in the photographic lineup when the confidence score of the given image is between a low threshold and a high threshold.

Some embodiments include presenting the photographic lineup to a witness. Some such embodiments also include receiving, from the witness, a selection of an image from the lineup.

BRIEF DESCRIPTION OF THE DRAWINGS

The foregoing features of embodiments will be more readily understood by reference to the following detailed description, taken with reference to the accompanying drawings, in which:

FIG. 5A, FIG. 5B and FIG. 5C schematically illustrate embodiments of a photographic lineup.

DETAILED DESCRIPTION OF SPECIFIC EMBODIMENTS

Various embodiments improve the reliability of photographic lineups by selecting images of fillers that are moderately similar to (i.e., similar to, but not too similar to) an image of the suspect. Moreover, some embodiments enable the creation of a photographic lineup in real time so that the photographic lineup can be presented to a witness before the witness leaves the crime scene, and/or before the suspect changes appearance.

A shortcoming of traditional lineups is that they are difficult, and often impossible, to set up without potentially significant delay between a crime and the lineup. For example, even if a suspect is apprehended at a crime scene immediately after a crime, and even if a witness is immediately available, it may still take days or weeks to find other people (known as "fillers") to fill-out the lineup. Moreover, creating a lineup inherently includes at least a risk of bias on the part of the person selecting the fillers. For example, the person selecting the fillers may—intentionally or subconsciously—select fillers that do not look much like the suspect, thus making the suspect stand out from the fillers. Alternately, the fillers that are available to the person making the selection simply may not look much like the suspect, again making the suspect stand out from the fillers even without bias or intent.

Photographic lineups, which use an image of the suspect and images of fillers, may mitigate some of those concerns. For example, if a database of photographs is available, an investigator may create a photographic lineup as soon as a photograph of the suspect becomes available, by selecting photographs from the database as fillers. Even photographic lineups, however, suffer from the bias of the person making the selection.

Figure 1:
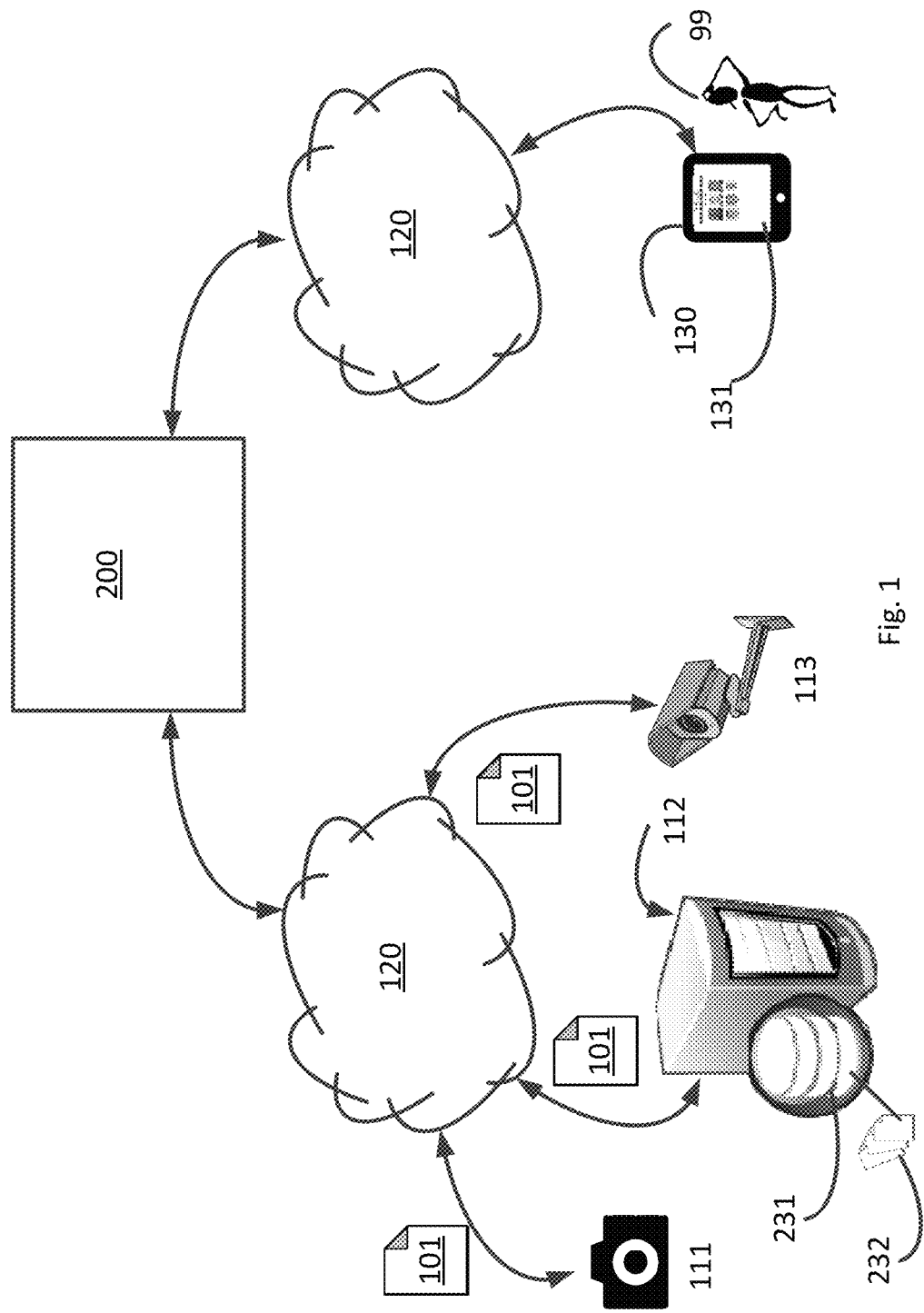
FIG. 1 schematically illustrates a network environment for various embodiments.

FIG. 1 schematically illustrates a network environment in which systems and methods described below may be used.

When a suspect is apprehended, the arresting officer may take a digital photograph of the suspect using a camera 111. Even if a suspect is not apprehended, an image 101 of the suspect may be available, for example from a security camera 113 near the crime scene. Such an image 101 may be used in a photographic lineup.

Even if no such images are available, an investigator may suspect the identity of the criminal based on information obtained through investigation, such as from a suggestion from a witness or documents found at the crime scene. If an image 101 of the suspect is available from a database server 112, such as a police database due to a previous arrest, or from a department of motor vehicles or other source, that image 101 may be used in a photographic lineup.

Nevertheless, photographic lineups still suffer from shortcomings. For example, even with such resources available, it may take an undesirable amount of time to create a photographic lineup, such as when a person selecting the fillers must comb through a database with a large number of photographs in order to select several photographs to fill-out the photographic lineup. Indeed, the use of computer technology may exacerbate this problem through its ability to store, and present to the person making the selection, a large number of potential filler photographs.

Moreover, even with the use of such technology, there exists a risk of bias on the part of the person selecting the fillers.

Figure 2:
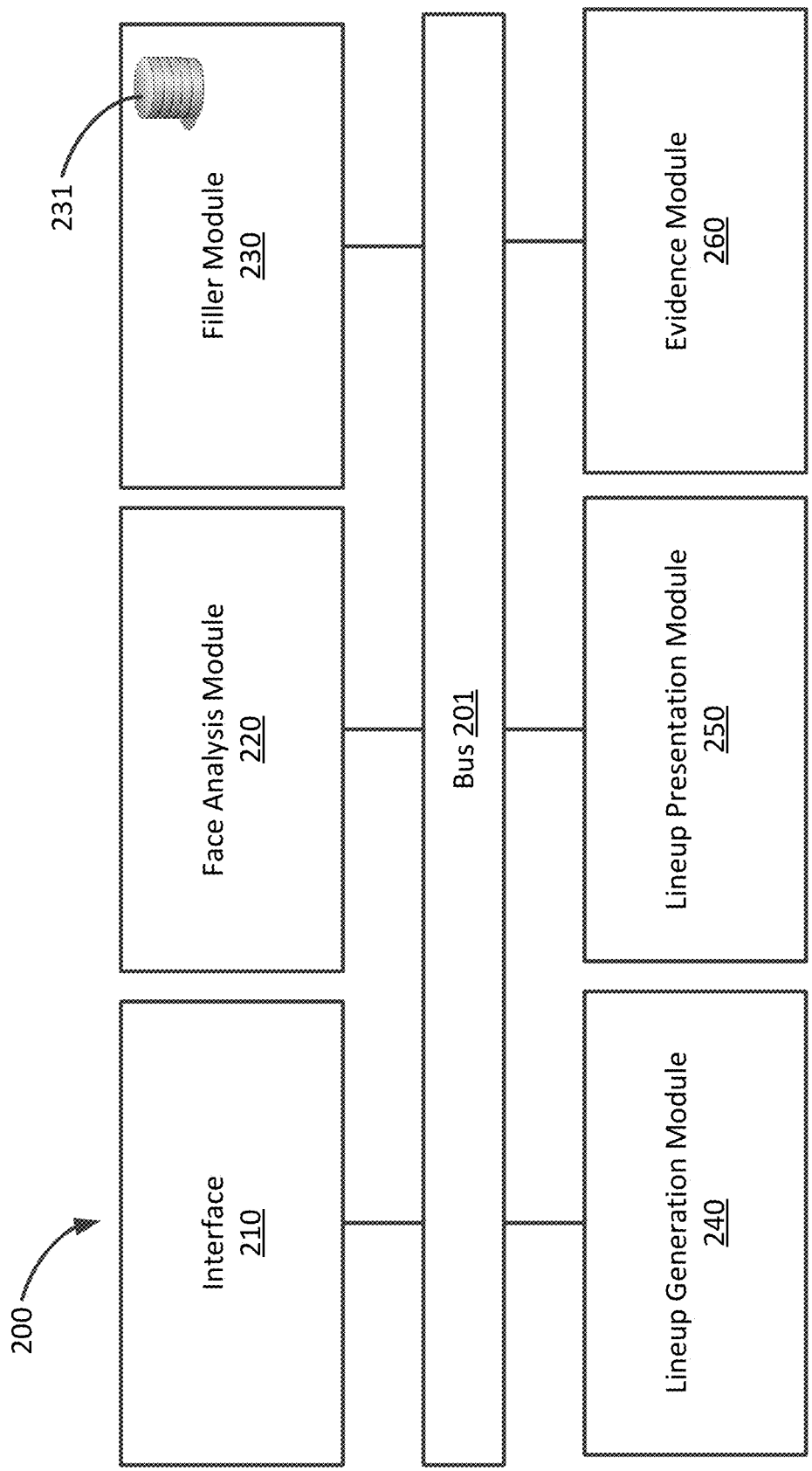
FIG. 2 schematically illustrates a system for implementing a photographic lineup.
Figure 3A:
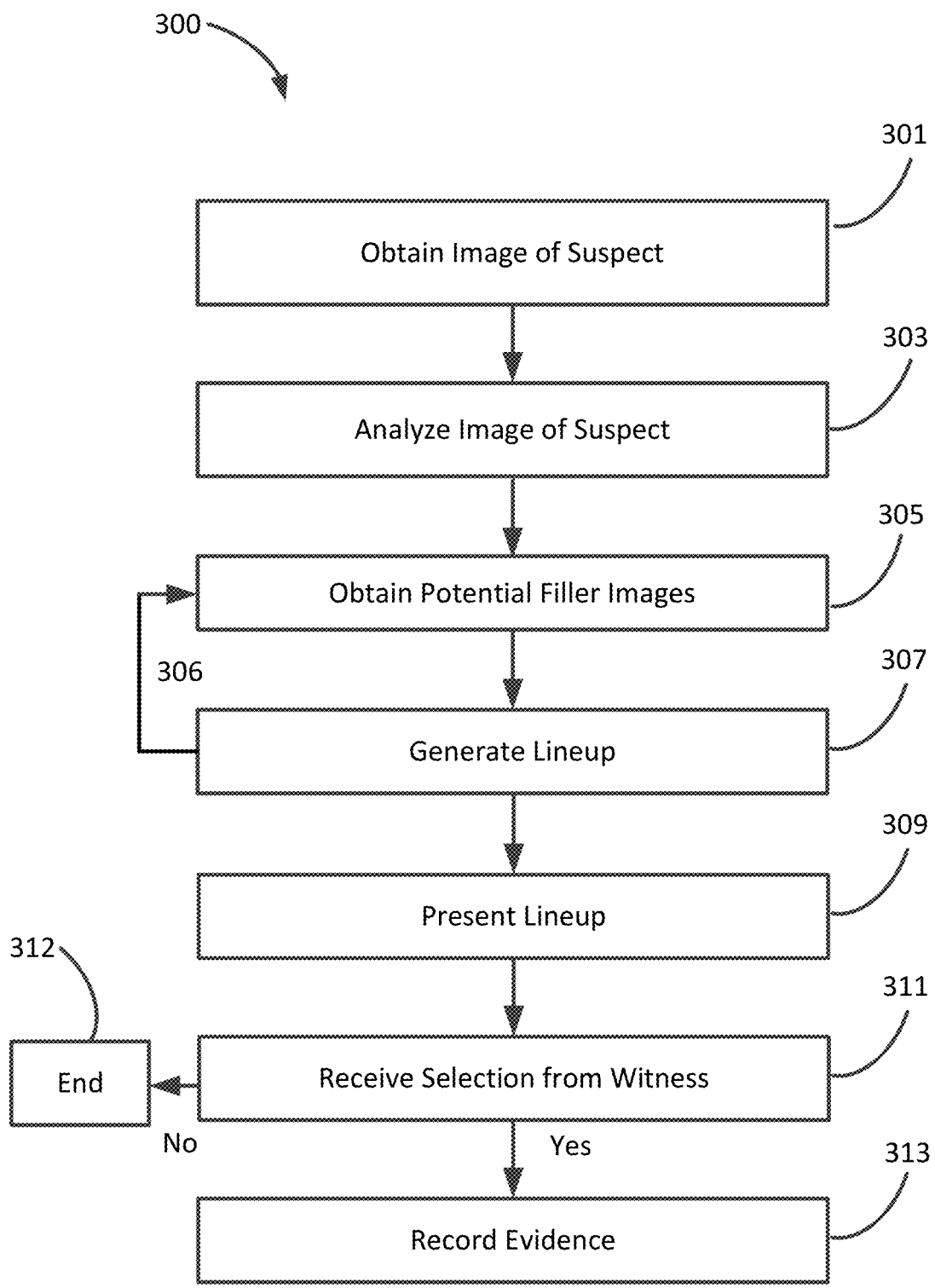
FIG. 3A is a flowchart of a method for implementing a photographic lineup.

Embodiments described herein mitigate or eliminate some or all of the foregoing problems through the use of image processing rules. FIG. 2 schematically illustrates a system 200 configured to create a photographic lineup according to an illustrative embodiment, and FIG. 3A is a flow chart illustrating a method 300 of creating a photographic lineup according to an illustrative embodiment.

The system 200 includes a communications interface 210 configured to receive, over data communication network 120, images such as an image 101 of a suspect taken from a camera 111 or a security camera 113, or from a database server 112.

In some embodiments, the communications interface 210 may also be configured to receive filler images from a database 231. Alternately, or in addition, the system 200 may include a filler module 230 configured to searchably store images of potential fillers, such as in a database 231 for example.

Figure 4:
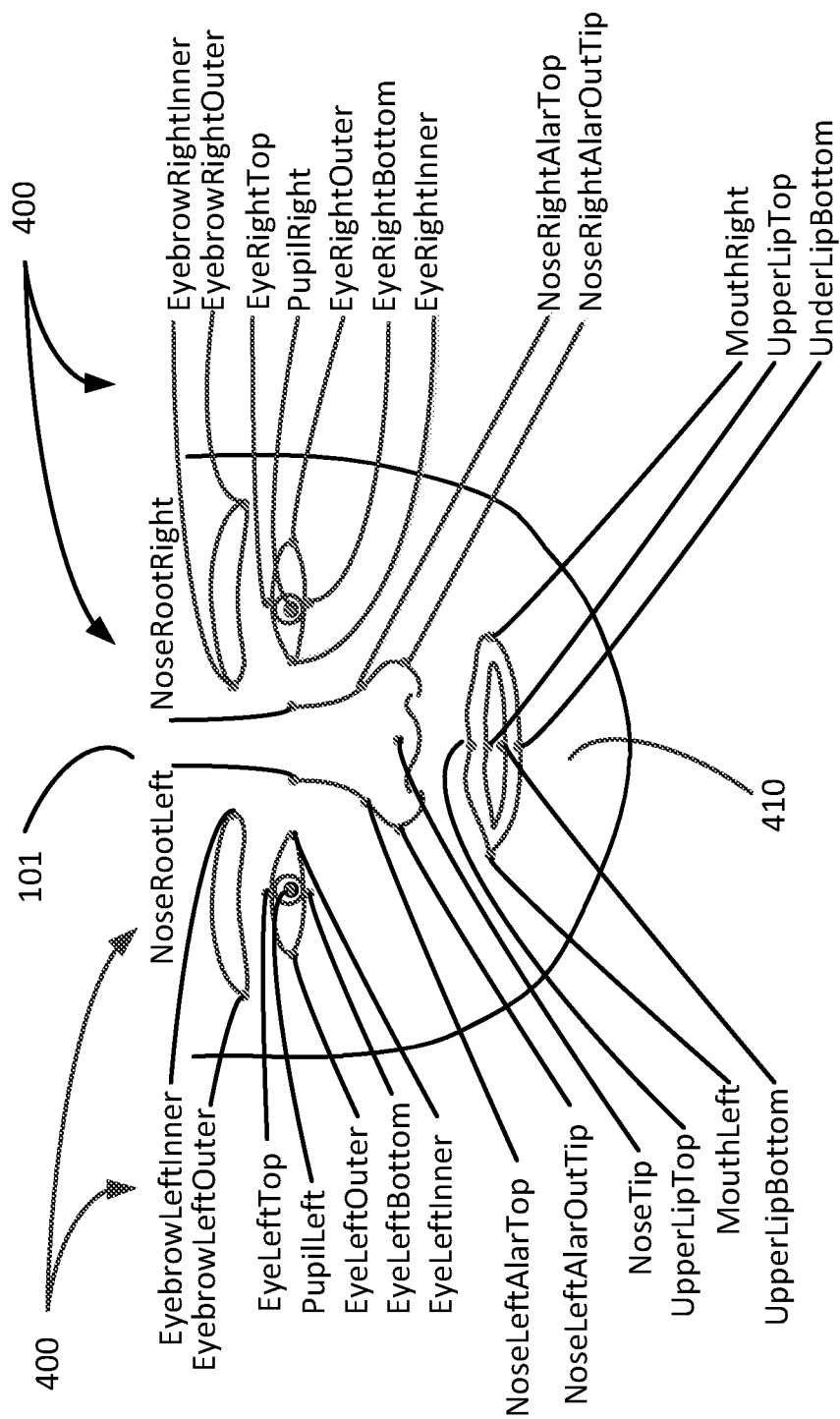
FIG. 4 schematically illustrates a facial analysis.

When the system 200 has an image 101 of a suspect for inclusion in a photographic lineup, a face analysis module 220 analyzes the suspect's image 101 to determine a set of objective facial features that can be used to compare the suspect's face in suspect's image 101 with faces in potential filler images 231. An example of a set 400 of objective facial features, of a face 410 in an image 101, is schematically illustrated in FIG. 4. In illustrative embodiments, each member of the set of objective facial features is defined by its location on the face, and/or its location relative to other members of the set of objective facial features, and/or its location relative to facial features of the face 410.

In some embodiments, the objective set of facial feature 400 is created by analyzing the suspect's image 101 for a set of features (in the example of FIG. 4, 26 facial features).

In some embodiments, if a corresponding set of objective facial features is not available for the face in a potential filler image 232, the face analysis module 220 produces a set of objective facial features for the potential filler image 232, in the same way that it produces a set of objective facial features for the suspect's image, to facilitate comparison of the images by the lineup generation module 240.

The filler module 230 is configured to compare the image 101 of the suspect to a plurality of available images 232 (each of which is a potential filler image), at least some of which images may be used as filler images. Some embodiments compare the suspect's image to the plurality of available images 232 by characterizing the suspect's image 101 and each of the plurality of available images 232 using a uniformly-applied analysis system, such as Microsoft Azure's face verification facility.

For each such comparison, Microsoft Azure's face verification facility generates a confidence score indicating how likely it is that the face in one image and the face in a second image belong to one person (i.e., the same person). In terms of comparing an available image 232 to the image 101 of the suspect, Microsoft Azure's face verification facility generates a confidence score indicating how likely it is that the face in the available image 232 belongs to the suspect, with 1.0 being the highest likelihood, and 0.0 being the lowest likelihood, and confidence scores between 0.0 and 1.0 representing likelihoods in-between.

For each available image 232 that is compared to the suspect's image 101, the filler module 230 applies a rule to the confidence score, to determine whether to include that available image 232 in the set of filler images. For example, the rule rejects the available image 232 (excludes it from the set of available images) if the confidence score indicates a high likelihood that the face in the available image is the face of the suspect. The threshold for determining that confidence score indicates such a high likelihood may be established by law, or by a designer of a system 200, or the person creating the lineup. For example, a confidence score at or above 0.8 may be such a high likelihood.

The rule also rejects the available image if the confidence score indicates too low a likelihood, since the face in such an image would most likely be so dissimilar to the suspect's face that the available image would make the suspect's image stand out to a witness. The threshold for determining that confidence score is too low may be established by law, or by a designer of a system 200, or the person creating the lineup. For example, a confidence score at or below 0.2 may be such a low likelihood.

The rule accepts the available image for inclusion into the set of filler images for any confidence score between those endpoints, in this example, a confidence score between 0.2 and 0.8. An available image 232 accepted in this way may be described as being similar to, but not overly similar to, the image 101 of the suspect. As described above, the process of identifying a filler image involves more than merely finding similar faces.

Of course, the confidence scores used in the foregoing examples are merely illustrative, and different scores could be specified for different applications. In general, the rules accept (or select) an available image for inclusion into the set of filler images for any confidence score between a high limit and a low limit, and rejects the available image otherwise. In preferred embodiments, the rule may be stated as follows: "Exclude the available image from the set of filler images if the confidence score is less than Low Limit or Greater than High Limit."

The following chart lists examples of such limits:

| Low Limit | High Limit |
|---|---|
| 0.2 | 0.8 |
| 0.1 | 0.5 |
| 0.3 | 0.7 |
| 0.35 | 0.85 |
| 0.5 | 0.9 |

Once the set of filler images is established, a person may create a photographic lineup by including the suspect's image 101 and some or all of the filler images.

The system 200 further includes a lineup generation module 240 configured to generate a photographic lineup from a set of filler images, along with the suspect's image. The set of available filler images may be referred to as the "mugshot" database, although the available filler images need not be mugshots per se.

The lineup generation module 240 selects filler images from the mugshot database using the set of objective facial features of the suspect's image and the sets of objective facial features of the available potential filler images. In this way, the filler images are selected objectively, using a process applied uniformly to the available filler images. The suspect's image 101, and the filler images may be referred to as the lineup images.

Some embodiments allow the person creating the photographic lineup to reject one or more of the filler images included among the lineup images. For example, the person creating the photographic lineup may reject a filler image if she recognizes that the filler image is an old photograph of the suspect, or is a photograph of a person of a different sex than the suspect, or a person having a feature that is clearly distinguishable from the suspect (e.g., a facial tattoo, if the suspect has no such tattoo), or is of a person of a different age or race than the suspect. Preferred embodiments, however, are configured to prevent the person creating the photographic lineup from adding, to photographic lineup, filler images not selected by the lineup generation module 240.

In some embodiments, the system 200 also includes a lineup presentation module 250, which is configured to present the photographic lineup to a witness, or to transmit the lineup to a display device visible to the witness. To that end, the lineup presentation module 250 arranges the lineup images, relative to one another, for presentation on a display screen (or "display device") 131. The display screen 131 may be a screen on a computer 130, such as a patrol car computer as commonly found in law enforcement vehicles, a laptop computer, a desktop computer, a server, or a tablet such as an iPad, to name but a few examples. In a simple example, the lineup images may be presented in a grid pattern, as schematically illustrated by photographic lineup 510 in FIG. 5A, for example.

In some embodiments, the location, within the photographic lineup 510, of the suspect's image 101 relative to the filler images 511 may be generated at random by the computer 130. In other embodiments, such location may be selected, or changed, by the person creating the photographic lineup.

In some embodiments, the lineup presentation module 250 is also configured to present a selection marker 521 indicating selection, by the witness 99, of an image from the photographic lineup. For example, in FIG. 5B, the selection marker 521 is a box around the selected image 520.

In some embodiments, the lineup presentation module 250 is also configured to present an authentication device 530 configured to capture the witness's authentication of the witness's selection. For example, in FIG. 5C, the authentication device 530 is a signature box configured to receive the witness's signature 531.

In some embodiments, the system 200 also includes an evidence module configured to record the photographic lineup 510, the selection marker 521, and the witness's authentication 531—in a fixed, non-transient, non-modifiable format. In this way, the lineup, selection marker 521 and the authentication 531 are preserved and can be used, for example, as evidence in a court.

In some embodiments, the system 200 may be implemented on a single computer, such as computer 130 for example. In other embodiments, portions of the system 200 may be implemented on two or more interconnected computers.

FIG. 3A is a flowchart illustrating an embodiment of a method 300 for creating a photographic lineup. The steps of the method 300 generally implement the functions of the modules of the system 200, described above. Some or all of the steps of the method 300 may be implements as a computer process, for example by computer code executing on a computer 130.

At step 301, a computer 130 obtains an image 101 of the suspect. This may occur, for example, by receipt at an interface 210 of an image from a camera 111, 113, or database 231 on a server 112, for example.

At step 303, the method analyzes the image as described above.

Figure 3B:
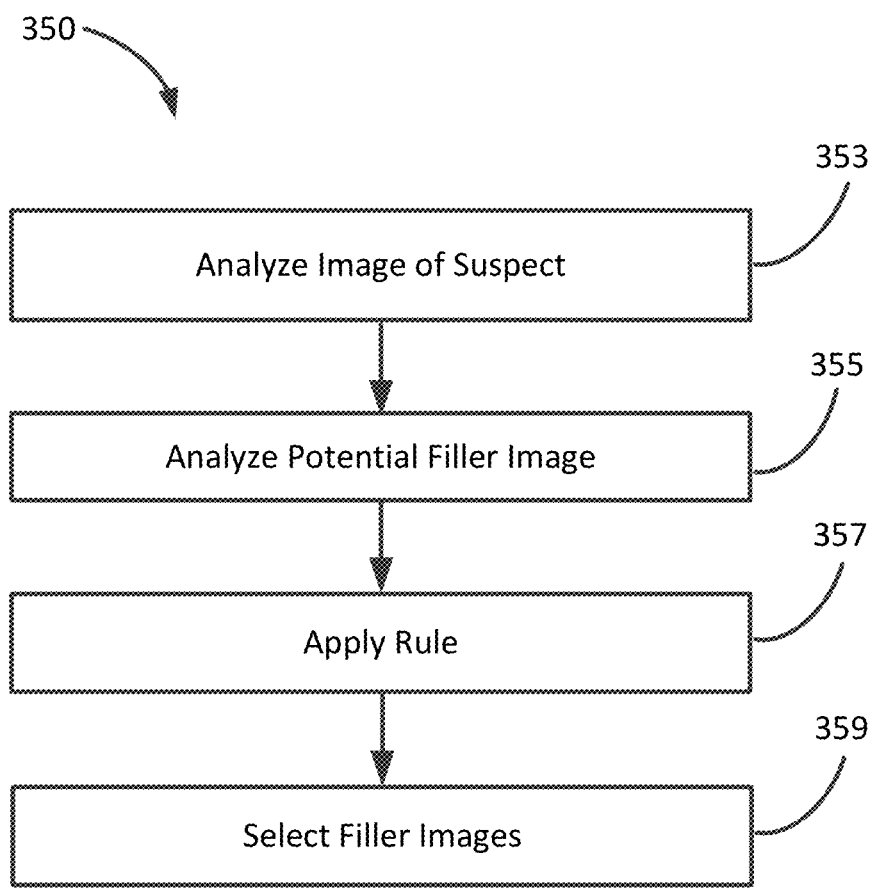
FIG. 3B is a flowchart of a method for selecting a filler image.

At step 305, a filler module 230 provides a plurality of potential filler images, as also described above, and in connection with the flowchart in FIG. 3B.

In step 307, a lineup generation module 240 generates a photographic lineup 510. In preferred embodiments, step 307 includes generating a confidence score for each available image, and applying a rule to the confidence score to determine whether to include that available image in the set of filler images. Examples of such rules and their application are provided above.

In preferred embodiments, the generation of the photographic lineup is fully automated, but in other embodiments, a person such as a detective or investigator may have input to the preparation of the photographic lineup. For example, the person preparing the photographic lineup 510 may reject images from among the filler images, and obtain additional filler images to replace the rejected filler images at step 306, by returning to and re-executing step 305.

The photographic lineup 510 is presented to the witness 99 at step 309. If and when the witness selects an image from among the images of the photographic lineup 510, the method 300 indicates that selection and records the witness's authentication at step 311.

Finally, at step 313, the method 300 records the photographic lineup 510, the witness's section and selection indicator, and the witness's authentication.

If the witness declines to make a selection, the method 300 terminates at step 312.

FIG. 3B is a flowchart of an embodiment of a method 350 for selecting a filler image, or a set of filler images.

In general, the method 350 compares the image 101 of the suspect to each potential filler image 232 of a plurality of potential filler images. Such a comparison is objective in that it operates on data, and eliminates subjective human judgment from the process. Illustrative embodiments of the method may be described as automatically and objectively comparing potential filler images 231 to an image 101 of a suspect to select, from the potential filler images 231, a set 512 of one or more filler images 511 to include in a photographic lineup 510.

Comparison of image faces to one another is known in the art of facial recognition. However, the art of facial recognition looks for similarities, with greater similarity between two images generating a higher probability (e.g., confidence score) that the two faces belong to the same person. In contrast, the method 350 for selecting a filler image is configured to avoid matching one face to another, and avoid selecting, as a filler image 511, a second image of the suspect. Rather, the method 350 for selecting a filler image is configured to find a face that is similar to the face of the suspect, but not too similar to the face of the suspect.

To that end, in the embodiment of FIG. 3B, step 353 analyzes the image 101 of the suspect to obtain a set of objective suspect facial features, as known in the art of facial recognition. In some embodiments, step 353 may extract, from the image 101 of the suspect, landmarks, or features, including one or more of the features listed in FIG. 4, and/or the (relative) position, size, and/or shape of the eyes, nose, cheekbones, and jaw, to name but a few examples.

Step 355 analyzes analyzing each face in a set of potential filler images 232. For each such face in the set of potential filler images, step 355 obtains a set of objective filler facial features, preferably corresponding to the objective suspect facial features obtained at step 353.

At step 357, the method 350 applies a rule to each of the potential filler images. The rule compares the set of objective suspect facial features to a the corresponding set of objective filler facial features, to select, from the set of potential filler images, a set of selected filler images 511. In illustrative embodiments, the compares the set of objective suspect facial features to a the corresponding set of objective filler facial features by comparing a confidence score to one or more thresholds, as described above.

The rule rejects the potential filler image 231 if the face in the potential filler image 231 is too similar to the face of the suspect in the suspect image 101 (e.g., the confidence score exceeds a high threshold). In preferred embodiments, the rule also rejects the potential filler image 231 if the face in the potential filler image 231 is too dissimilar (or is not sufficiently similar) to the face of the suspect in the suspect image 101 (e.g., the confidence score is below a low threshold). In contrast, the rule selects, at step 359, the filler image for inclusion in photographic lineup if the face in the filler image is not too similar to, and not too dissimilar to, the face of the suspect (e.g., the confidence score does not exceed the high threshold and is not below the low threshold). By repeating this process for each face in a set of potential filler images, the method selects a set of filler images for inclusion in the photographic lineup.

One embodiment of such a rule is described above in connection with Microsoft Azure's face verification facility, but embodiments described herein are not limited to that example.

As known in the art of face recognition, face recognition algorithms that compare a first image of a face to a second image of a face are capable of determining—based on the assessment of the objective suspect facial features relative to the corresponding set of objective filler facial features—whether those faces are sufficiently similar to one another to conclude that the faces belongs to the same person. For example, in general a face recognition algorithm concludes that there is a specific likelihood that the faces belong to the same person. Such a specific likelihood may be deemed to be a confidence score, as described above, and may be used to select a given potential filler image for inclusion into the photographic lineup as a filler image 511, or to reject that given potential filler image 232.

As used herein, a "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Embodiments summarized above have the effect of transforming the nature of creating a police lineup from one that has existed in the physical world to one that is partially or fully automated, and one that recues or eliminates subjective biases of people creating the lineup. These improvements allow a computer to create a photographic police lineup, which computers have never before been able to do without human input and guidance. For these reasons, among others, the activities defined by the claims below are not well-understood, routine, or conventional to a skilled artisan in the field of the present invention.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for creating a photographic lineup, including an image of a suspect in a crime, the system comprising:
a communications interface configured to receive the image of the suspect;
a filler module configured to:
compare the image of the suspect to a plurality of available images, by generating, for each available image of the plurality of available images, a confidence score between 0.0 and 1.0 inclusive indicating a likelihood that the available image is of the suspect, wherein 0.0 is a lowest likelihood and 1.0 is a highest likelihood;

applying a rule to each confidence score to determine whether to include the corresponding available image in a set of filler images, wherein the rule rejects an available image if said image's confidence score exceeds a high threshold; and select, from the plurality of available images, a set of filler images according to the rule; and a lineup generation module configured to produce a photographic lineup including the image of the suspect and the set of filler images.

2. The system of claim 1, further comprising a lineup presentation module configured to display the photographic lineup on a display device.

3. The system of claim 2, further comprising an evidence module configured to record the selection, by a witness, of a single image from the photographic lineup.

4. The system of claim 3, wherein the evidence module is further configured to record an authentication of the selection by the witness.

5. The system of claim 1, wherein the image of the suspect is located, within the photographic lineup, at a randomly selected location with respect to the filler images.

6. The system of claim 1, wherein the image of the suspect is located, within the photographic lineup, at a specified location relative to the filler images.

7. The system of claim 1, wherein:
the system further comprises a face analysis module configured to generate, from the image of the suspect, a set of suspect facial features; and
wherein the filler module is configured to compare the image of the suspect to a plurality of available images by comparing the set of suspect facial features to corresponding sets of facial features for each of the plurality of available images.

8. The system of claim 1, wherein the rule rejects a given image from among the available images if the confidence score for the given image is below a low threshold.

9. The system of claim 1, wherein the confidence score is generated using Microsoft Azure's face verification facility.

10. The system of claim 1, wherein the high threshold is 0.5.

11. The system of claim 1, wherein the high threshold is 0.7.

12. The system of claim 1, wherein the high threshold is 0.8.

13. The system of claim 1, wherein the high threshold is 0.85.

14. The system of claim 1, wherein the high threshold is 0.9.

15. A method for operating a photographic lineup, including an image of the face of a suspect, the method comprising:
analyzing the image of the face of the suspect to develop a set of objective suspect facial features;
analyzing each face in a set of potential filler images to develop, for each face in the set of potential filler images, a set of objective filler facial features;
assigning, for each potential filler image of the set based on each such image's set of objective filler facial features, a confidence score indicating a likelihood that the potential filler image is of the suspect;
for each face in the set of filler images, applying a rule to select, from the set of potential filler images, a set of selected filler images wherein the rule rejects a potential filler image if said image's confidence score exceeds a high threshold; and
producing a photographic lineup, the photographic lineup including the image of the face of the suspect, and the set of selected filler images.

16. The method of claim 15, wherein applying the rule further comprises rejecting an image when the confidence score is below the threshold.

17. The method of claim 15, wherein producing a photographic lineup comprises including a given image in the photographic lineup when the confidence score of the given image is between a low threshold and a high threshold.

18. The method of claim 15, further comprising presenting the photographic lineup to a witness.

19. The method of claim 18, further comprising receiving, from the witness, a selection of an image from the lineup.

20. A system for creating a photographic lineup, including an image of a suspect in a crime, the system comprising:
a communications interface configured to receive the image of the suspect;
means for assigning a confidence score to each image of a plurality of available images, said confidence score indicating a likelihood that the available image is of the suspect;
means for applying a rule to select, from the set of available images, a set of selected filler images, wherein the rule rejects an available image if said image's confidence score exceeds a high threshold and selects said available image if said image's confidence score is below the high threshold; and
means for generating a photographic lineup including the image of the suspect and the set of selected filler images.

21. The system of claim 20, further comprising means for displaying the photographic lineup to a witness.

22. The system of claim 21, further comprising means for receiving, from the witness, a selection by the witness of an image from the photographic lineup.

* * * * *